United States Patent
Takeuchi

(10) Patent No.: US 7,305,060 B2
(45) Date of Patent: Dec. 4, 2007

(54) SPREAD RANGE CONTROL APPARATUS

(75) Inventor: Kesatoshi Takeuchi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 519 days.

(21) Appl. No.: 10/460,391

(22) Filed: Jun. 13, 2003

(65) Prior Publication Data

US 2004/0114669 A1 Jun. 17, 2004

(30) Foreign Application Priority Data

Jun. 19, 2002 (JP) ............................. 2002-178412

(51) Int. Cl.
*H03D 3/24* (2006.01)
(52) U.S. Cl. ................ 375/376; 375/375; 375/130; 375/140
(58) Field of Classification Search .......... 375/375, 375/376, 140, 130, 367; 713/500; 331/10, 331/78
See application file for complete search history.

(56) References Cited

U.S. PATENT DOCUMENTS

| 6,553,057 B1 * | 4/2003 | Sha et al. ................. 375/130 |
| 6,687,319 B1 * | 2/2004 | Perino et al. .............. 375/367 |
| 6,850,554 B1 * | 2/2005 | Sha et al. ................. 375/140 |
| 6,980,581 B1 * | 12/2005 | Sha et al. ................. 375/130 |
| 7,015,764 B2 * | 3/2006 | Starr et al. ................. 331/78 |
| 2003/0163748 A1 * | 8/2003 | Calkins et al. ............. 713/500 |

\* cited by examiner

*Primary Examiner*—Phuong Phu
(74) *Attorney, Agent, or Firm*—Oliff & Berridge, PLC

(57) ABSTRACT

A spread range control apparatus of the present invention controls a clock generator, which generates a spread spectrum clock based on setting of spread data, so as to regulate a spread range of the spread spectrum clock. The spread range control apparatus includes: a loading quantity detection module that detects a loading quantity of a loading device, which is driven in response to a clock output from the clock generator; and a spread range setting module that sets spread data, which represents a spread range corresponding to the loading quantity detected by the loading quantity detection module, in the clock generator. This arrangement effectively protects a device having operations controlled in response to a clock from adverse effects possibly arising due to spread of the clock.

2 Claims, 2 Drawing Sheets

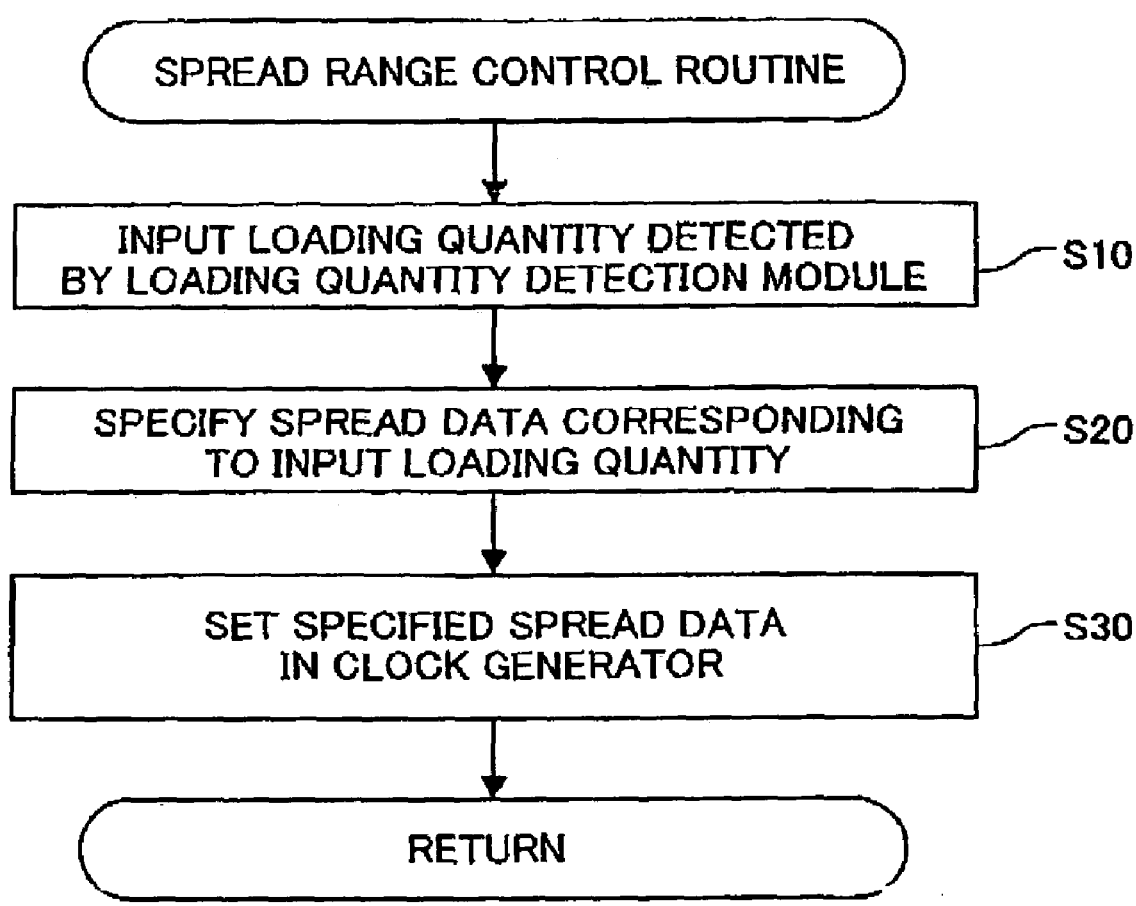

SPREAD RANGE CONTROL APPARATUS

BACKGROUND OF THE INVENTION

1. Field of the Invention

The present invention relates to a technique of controlling a spread range set in a clock generator that generates a spread spectrum clock.

2. Description of the Related Art

Noise generated from any of diverse electronic devices often gives adverse electromagnetic interferences (EMI) with another electronic device. Diverse restrictions have accordingly been set with regard to the noise generated from electronic devices (hereafter referred to as 'EMI noise').

Manufacturers that develop and manufacture such electronic devices naturally try to minimize the EMI noise generated from their electronic devices, in order to make the electronic devices meet the restrictions of the EMI noise.

The respective units constituting a certain electronic device are generally driven and controlled in response to given clocks. The frequency spectrum of a clock typically has peaks of its amplitude at an oscillation frequency of the clock (fundamental wave: f1) and respective frequencies (f2, f3 . . . ) corresponding to its harmonies. The frequency spectrum of the EMI noise generated from the electronic device accordingly has peaks of its amplitude at the oscillation frequency (f1) of the clock and the respective frequencies (f2, f3, . . . ) corresponding to its harmonies. For reduction of the EMI noise, it is required to lower the peaks of the amplitude generated at the fundamental wave of the clock and the respective frequencies of its harmonies. One proposed technique dynamically varies the oscillation frequency of the clock output from a clock generator to spread the frequency spectrum of the clock and thereby lowers the peaks of the amplitude on the frequency spectrum generated at the fundamental wave (f1) of the clock and the respective frequencies (f2, f3 . . . ) of its harmonies. In the description hereafter, the action of varying the oscillation frequency of the clock to spread the frequency spectrum is called the 'spread spectrum'. The variation in oscillation frequency of the clock by the spread spectrum is referred to as the 'spread range'. The clock having the spread frequency spectrum is referred to as the 'spread spectrum clock'.

Each manufacturer experimentally specifies in advance a spread range that meets the restrictions of the EMI noise generated from each manufactured electronic device and makes the frequency of the clock spread by the specified constant spread range.

The spread range of the clock is set in advance to a fixed value to meet the restrictions of the EMI noise as mentioned above. The setting of the spread range may, however, have adverse effects on the operations of a certain electronic device in some state of driving load of the electronic device. One typical procedure of the EMI noise measures assumes a heavy load and spreads the frequency of the clock by a designed single spread range. Even when the electronic device is actually driven in the state of a light load, the operations of the electronic device are based on the clock, which has been subjected to the spread spectrum on the assumption of a heavy load. This may adversely affect the operations of the electronic device.

For example, a projector may be used in a dark place to display a screen image with a low level of lighting luminance set in its light source unit. In such cases, a viewer who watches the screen image is relatively sensitive to a variation in luminance of the screen image. When the frequency of the clock, which is used to control the operations of the light source unit, is spread and varied, a variation in lighting luminance accompanied with the frequency variation may become prominent in some level of the spread range.

SUMMARY OF THE INVENTION

The object of the present invention is thus to solve the drawbacks of the prior art techniques and to provide a technique of protecting a device having operations controlled in response to a clock from adverse effects possibly arising due to spread of the clock's spectrum.

In order to attain at least part of the above and other related objects, the present invention is directed to a spread range control apparatus that controls a clock generator, which generates a spread spectrum clock based on setting of spread data, so as to regulate a spread range of the spread spectrum clock. The spread range control apparatus includes: a loading quantity detection module that detects a loading quantity of a loading device, which is driven in response to a clock output from the clock generator; and a spread range setting module that sets spread data, which represents a spread range corresponding to the loading quantity detected by the loading quantity detection module, in the clock generator.

The spread range control apparatus of the present invention sets the spread data representing the spread range, which is corresponding to the loading quantity of the loading device detected by the loading quantity detection module, in the clock generator. The technique enables the spread range of the spread spectrum clock output from the clock generator to be readily varied with a variation in loading quantity of the loading device. This arrangement thus effectively protects a device having operations controlled in response to a clock from adverse effects possibly arising due to spread of the clock.

In one preferable application of the spread range control apparatus of the present invention, either an electric current or an electric power consumed by the loading device is utilized as the loading quantity of the loading device.

This arrangement ensures easy detection of the variation in loading quantity of the loading device.

These and other objects, features, aspects, and advantages of the present invention will become more apparent from the following detailed description of the preferred embodiment with the accompanying drawings.

BRIEF DESCRIPTION OF THE DRAWINGS

FIG. 2 is a flowchart showing a spread range control routine executed by a spread range setting module included in the clock spread spectrum control apparatus.

DESCRIPTION OF THE PREFERRED EMBODIMENTS

Figure 1:
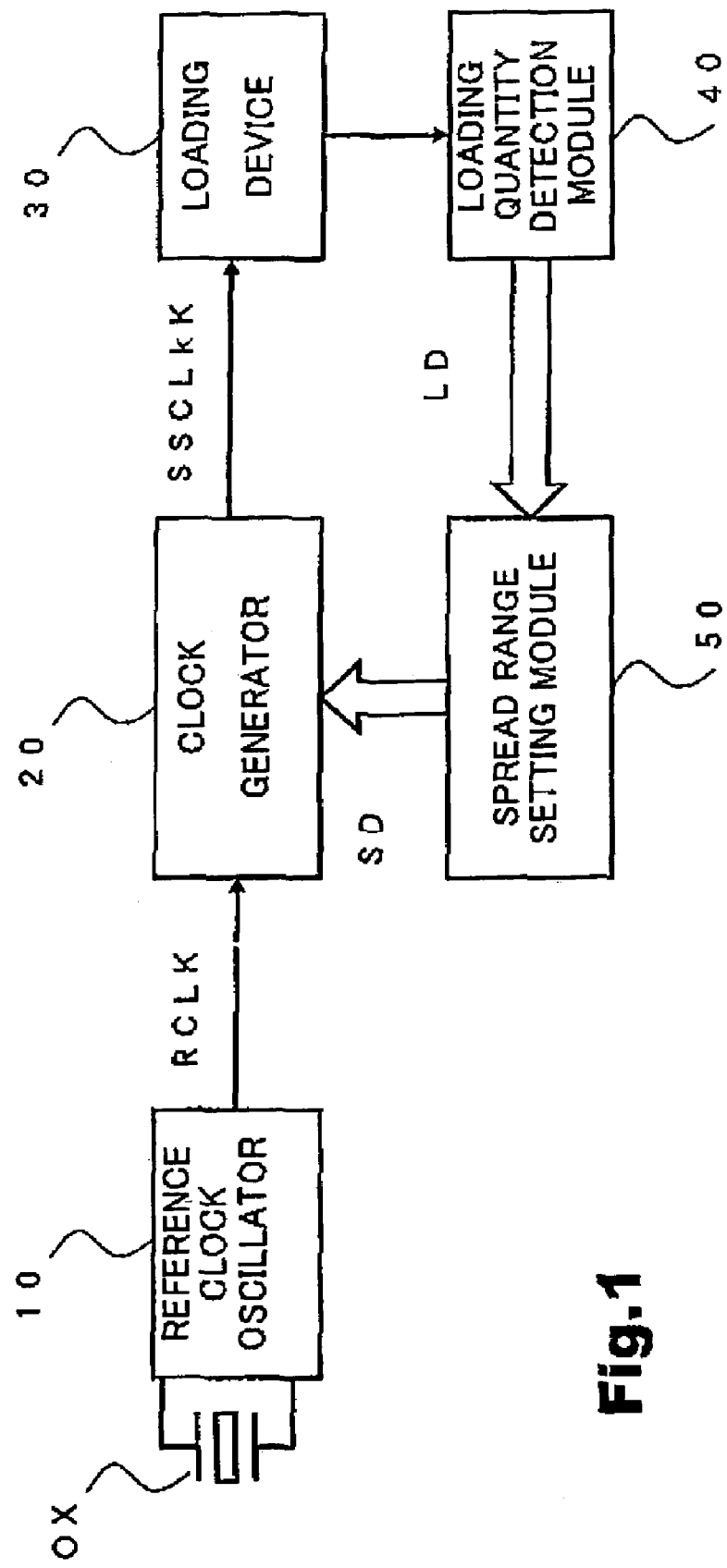
FIG. 1 is a block diagram illustrating a clock spread spectrum control apparatus in one embodiment of the present invention.

One mode of carrying out the invention is discussed below as a preferred embodiment. FIG. 1 is a block diagram illustrating a clock spread spectrum control apparatus in one embodiment of the present invention. The clock spread spectrum control apparatus includes a reference clock oscillator 10, a clock generator 20, a loading device 30, a loading quantity detection module 40, and a spread range setting module 50.

The reference clock oscillator 10 outputs a reference clock RCLK having a frequency corresponding to a vibration frequency of a quartz oscillator OX connecting therewith.

The clock generator 20 generates a driving clock SSCLK, which is used for actuation of the loading device 30. A device of dynamically varying the oscillation frequency of the driving clock SSCLK based on data representing a spread range (hereafter referred to as 'spread data') to output a spread spectrum clock is applicable to the clock generator 20. It is required that the spread data is set in an externally updatable manner. Diverse clock generators are applicable for the clock generator 20. Typical examples include a clock generator MK1705 manufactured by Integrated Circuit Systems Inc. and a clock generator disclosed in JAPANESE PATENT LAID-OPEN GAZETTE No. 9-98152. The reference clock oscillator 10 may be incorporated in the clock generator 20 according to the requirements.

The loading device 30 is driven and controlled in response to the driving clock SSCLK output from the clock generator 20. For example, the loading device 30 may be a light source unit, a motor, a CPU, or any of other diverse electronic circuits.

The loading quantity detection module 40 detects a preset loading quantity of the loading device 30. Data representing the detected loading quantity (hereafter referred to as 'loading data') is given to the spread range setting module 50. The preset loading quantity of the loading device 30 may be a physical quantity that varies with a variation in magnitude of a load applied to the loading device 30, for example, an electric current or an electric power consumed by the loading device 30. The loading quantity of the loading device 30 may alternatively be specified indirectly from a temperature variation in the loading device 30. Namely the loading quantity of the loading device 30 is any physical quantity that represents the magnitude of loading on the loading device 30.

The spread range setting module 50 is a computer including a CPU, a RAM, and a ROM (none of the constituents is shown). The spread range setting module 50 executes a software program stored the ROM to read data from the ROM and supply the read-out data as spread data SD to the clock generator 20. The clock generator 20 outputs the spread spectrum clock based on the supplied spread data SD as described above. The spread data SD represents a spread range corresponding to the clock generator 20 used here.

The spread range setting module 50 repeatedly executes a spread range control routine shown in the flowchart of FIG. 2 to supply the spread data SD to the clock generator 20. When the program enters the spread range control routine, the spread range setting module 50 first receives input of loading data LD, which represents the loading quantity of the loading device 30 detected by the loading quantity detection module 40, at step S10 and specifies spread data SD corresponding to the input loading quantity at step S20. The spread range setting module 50 subsequently sets the specified spread data SD in the clock generator 20 at step S30. A correspondence of the spread data SD to the loading quantity is stored in advance in the ROM (not shown). The relationship between the loading quantity and the spread range is determined in advance experimentally, and the spread data SD representing the spread range is set according to the format of the clock generator 20.

For example, when a light source unit of a projector is applied for the loading device 30, the procedure sets the correspondence of the loading quantity to the spread data representing the spread range by taking into account the factors discussed below and specifies the spread data, which is to be set in the clock generator 20, based on the correspondence.

A lighting luminance (corresponding to a load) in the light source unit of the projector may be adjusted according to the working environment of the projector. When the projector is used in a relatively dark room, for example, to make a viewer watch a movie, the required level of the lighting luminance in the light source unit is relatively low (this corresponds to the state of a light load). When the projector is used in a relatively bright room, for example, to make the viewer watch a TV program, on the contrary, the required level of the lighting luminance in the light source unit is as high as possible (this corresponds to the state of a heavy load). The electric current or the electric power consumed by lighting of the light source unit is varied with a variation in required level of the lighting luminance. The consumed electric current or electric power increases in the case of a high required level of the lighting luminance or in the state of a heavy load, while decreasing in the case of a low required level of the lighting luminance or in the state of a light load.

The EMI noise tends to be relatively high, when lighting of the light source unit consumes a large electric current or electric power to cause a heavy load. It is accordingly desirable to set the spread range of the clock to a relatively high level. The EMI noise tends to be relatively low, on the other hand, when lighting of the light source unit consumes only a small electric current or electric power to cause a light load. It is thus allowed to set the spread range of the clock to a relatively low level.

In the case of a low required level of the lighting luminance or in the state of a light load in a dark place, the viewer who watches a screen image is relatively sensitive to a variation in luminance of the screen image. It is accordingly desirable to set the spread range to a relatively low level. In the case of a high required level of the lighting luminance or in the state of a heavy load in a bright place, on the contrary, the viewer is relatively insensitive to the variation in luminance of the screen image. It is thus allowed to set the spread range to a relatively high level.

In the case where a light source unit of a projector is the loading device 30 driven and controlled by the clock generator 20, the arrangement of varying the spread range of the clock with a variation in consumed electric current or electric power, which corresponds to the lighting luminance as the load of the light source unit, ensures the effective EMI noise measures.

In another example, when a motor is applied for the loading device 30, the procedure sets the correspondence of the loading quantity to the spread data representing the spread range by taking into account the factors discussed below and specifies the spread data, which is to be set in the clock generator 20, based on the correspondence.

The revolution speed of the motor may be adjusted according to the driving load of the motor. In the case of a light load, the motor is controlled to have relatively high-speed revolutions. In the case of a heavy load, on the other hand, the motor is controlled to have relatively low-speed revolutions. The electric current or the electric power consumed by the motor is varied with a variation in loading quantity. Namely the consumed electric current or electric power decreases in the case of a light load and increases in the case of a heavy load.

Sensitive control is required for the motor under high-speed revolutions. It is accordingly desirable to set the spread range of the driving clock as the reference of the rotation control to a relatively low level. Rough control is sufficient, on the other hand, for the motor under low-speed revolutions. It is thus allowed to set the spread range of the driving clock to a relatively high level.

In the case where a motor is the loading device 30 driven and controlled by the clock generator 20, the arrangement of varying the spread range of the clock with a variation in consumed electric current or electric power, which corresponds to the driving load of the motor, ensures the effective EMI noise measures.

As described above, in the clock spread spectrum control apparatus of this embodiment, the spread range of the clock output from the clock generator 20 is specified according to the loading quantity of the loading device 30, which is driven and controlled by the clock generator 20. This arrangement effectively protects a device having operations controlled in response to a clock from adverse effects possibly arising due to spread of the clock.

The above embodiment is to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein.

For example, in the structure of the embodiment discussed above, the loading quantity detection module 40 and the spread range setting module 50 are constructed as separate blocks. In one modified structure, a loading quantity detection module may have the functions of both the loading quantity detection module 40 and the spread range setting module 50. The loading quantity detection module works to set the specified spread data in the clock generator.

The scope and spirit of the present invention are indicated by the appended claims, rather than by the foregoing description.

What is claimed is:

1. A spread range control apparatus that controls a clock generator, which generates a spread spectrum clock based on setting of spread data, so as to regulate a spread range of the spread spectrum clock, the spread range control apparatus comprising:

a loading quantity detection module that detects a loading quantity of a loading device, which is driven in response to a clock output from the clock generator, wherein the loading quantity of the loading device is either of an electric current and an electric power consumed by the loading device; and a spread range setting module that sets spread data, which represents a spread range corresponding to the loading quantity detected by the loading quantity detection module, in the clock generator.

2. A spread range control apparatus that controls a clock generator, which generates a spread spectrum clock based on setting of spread data, so as to regulate a spread range of the spread spectrum clock, the spread range control apparatus comprising:

a loading quantity detection module that detects a loading quantity of a loading device, which is driven in response to a clock output from the clock generator, wherein the loading quantity of the loading device is specified indirectly from a temperature variation in the loading device; and a spread range setting module that sets spread data, which represents a spread range corresponding to the loading quantity detected by the loading quantity detection module, in the clock generator.

* * * * *